United States Patent
Kyoya

[11] Patent Number: 5,841,923
[45] Date of Patent: Nov. 24, 1998

[54] LIGHT-EMITTING MODULE

[75] Inventor: Shouichi Kyoya, Miyagi-ken, Japan

[73] Assignee: Alps Electric Co., Ltd., Tokyo, Japan

[21] Appl. No.: 791,969

[22] Filed: Jan. 31, 1997

[30] Foreign Application Priority Data

Feb. 5, 1996 [JP] Japan .................................. 8-019136

[51] Int. Cl.$^6$ .................................................. G02B 6/255
[52] U.S. Cl. ................................................ 385/93; 385/33
[58] Field of Search ................................ 385/37, 88, 89, 385/90, 92, 93

[56] References Cited

U.S. PATENT DOCUMENTS

| | | | |
|---|---|---|---|
| 4,047,030 | 9/1977 | Lobach | 250/281 |
| 4,989,968 | 2/1991 | Freedam | 351/206 |
| 5,087,109 | 2/1992 | Ishizuka et al. | 385/34 |
| 5,195,155 | 3/1993 | Shimaoka et al. | 385/90 |
| 5,311,494 | 5/1994 | Sugita et al. | 369/100 |
| 5,333,225 | 7/1994 | Jacobowitz et al. | 385/93 |
| 5,351,330 | 9/1994 | Jongewaard | 385/93 |
| 5,495,545 | 2/1996 | Cinaetal | 385/92 |
| 5,515,469 | 5/1996 | Zarem et al. | 385/92 |
| 5,557,348 | 9/1996 | Umeda et al. | 351/169 |
| 5,633,695 | 5/1997 | Feke et al. | 351/221 |

*Primary Examiner*—Akm E. Ullah
*Attorney, Agent, or Firm*—Brinks Hofer Gilson & Lione

[57] ABSTRACT

A light-emitting module includes a laser diode, a lens, and an optical fiber having an end face cut at an angle, which are co-axially disposed. The lens has an aperture eccentrically disposed opposite to the vertical direction with respect to an end face of the optical fiber. This arrangement causes light refracted by an end face of the core of the optical fiber to travel in the axial direction, which prevents reflected light from returning.

7 Claims, 2 Drawing Sheets

LIGHT-EMITTING MODULE

BACKGROUND OF THE INVENTION

1. Field of the Invention

The present invention relates to light-emitting modules, and in particular to a light-emitting module including an optical fiber which has an incident end face cut at an angle to prevent light from a light source from being reflected by the incident end face and returning to the light source.

2. Description of the Related Art

A conventional light-emitting module that uses an optical fiber having an incident end face cut at an angle (referred to hereinafter as an "obliquely cut optical fiber") in order to prevent light from returning is disclosed in patent publications such as Japanese Examined Patent Publications Nos. 4-66323, 5-56483 and 6-64218.

By referring to FIG. 3 which shows an example of the conventional light-emitting module, a laser diode 1 is supported by a laser diode holder 1a, and both a lens 2 and a lens barrel 3 are supported by the lens holder 2a. A hood 4, a ferrule holder 5 and a rubber hood 6 are fixed along the emergent direction of the lens 2. The head of an optical fiber 7 is provided with a ferrule 8 which engages with the ferrule holder 5. Ends of the optical fiber 7 and the ferrule 8 are cut at an angle.

In such a case in which the obliquely cut optical fiber 7 is used, light is refracted by the surface of the core of the optical fiber 7 as shown in FIG. 4. Therefore, in order for the light to travel along the axis of the core, an incident angle $\theta$ with respect to the optical fiber 7 must have a value calculated as follows:

$$\sin(\theta+\theta_F) = n \cdot \sin\theta_F$$
$$\therefore \theta = \{\sin^{-1}(n \cdot \sin\theta_F)\} - \theta_F \qquad (1)$$

where $\theta_F$ represents a cut angle, and n represents the refractive index of the core. Consequently, as shown in FIG. 3, the laser diode 1 is eccentric along a normal direction with respect to the optical axis of the lens 2, and the optical fiber 7 is eccentric along a reverse direction.

According to the conventional light-emitting module in which the above-described, obliquely cut optical fiber 7 is used, the laser diode 1 and the optical fiber 7 are eccentric in mutually opposite directions with respect to the optical axis of the lens 2. Both determine the outer diameter of the light-emitting module, which makes it difficult to reduce the size of the light-emitting module. In particular, in the example shown in FIG. 3, the lens holder 2a extends up to the position of the laser diode 1 and the thickness of a portion A of the lens holder 2a is smaller than the thickness of other portions, so that the portion A is weak against vibration and shock. If the thickness of the portion A is increased, the outer diameter remarkably increases.

The ferrule holder 5 is eccentric with respect to the lens holder 2a, thus, in order for the ferrule holder 5 to not butt into the hood 4, the diameter of the ferrule holder 5 must be decreased. However, a decreased diameter of the ferrule holder 5 reduces the contact area of the ferrule holder 5 and the lens holder 2a, which causes unstable fixation (welding) of both.

In addition, the rubber hood 6 is used to prevent disconnection due to bending of the optical fiber 7. Since the ferrule 8 is also eccentric with respect to the rubber hood 6, the inner diameter of the rubber hood 6 needs to be increased, which causes the rubber hood 6 to insufficiently function in preventing disconnection.

SUMMARY OF THE INVENTION

Accordingly, in view of the above conventional problems, it is an object of the present invention to provide a light-emitting module whose size can be reduced even when an obliquely cut optical fiber is used.

According to the prevent invention, the foregoing object is achieved by the provision of a light-emitting module in which a laser diode, a lens, and an optical fiber having an end face cut at an angle are co-axially disposed, the lens having an aperture eccentrically disposed opposite to the vertical direction with respect to an end face of the optical fiber so that light refracted by an end face of the core of the optical fiber travels in the axial direction.

To form the aperture, the shape of the lens may be changed, or a layer such as a light-shielding layer may be formed on a surface of the lens. However, the use of an opening in the lens holder for supporting the lens is more effective. In this case, by only shifting the position of the opening required for the lens holder from the optical axis of the lens, the aperture can be eccentrically disposed.

As described above, according to the present invention, the laser diode, the lens, and the optical fiber having an end face cut at an angle are co-axially disposed, and the lens has an aperture eccentrically disposed opposite to the vertical direction with respect to an end face of the optical fiber so that light refracted by an end face of the core of the optical fiber travels in the axial direction. Therefore, this arrangement can reduce the outer diameter of the light-emitting module even when the obliquely cut optical fiber is used, thus, the arrangement is effective in reduction in the size of the light-emitting module.

DESCRIPTION OF THE PREFERRED EMBODIMENT

Figure 1:
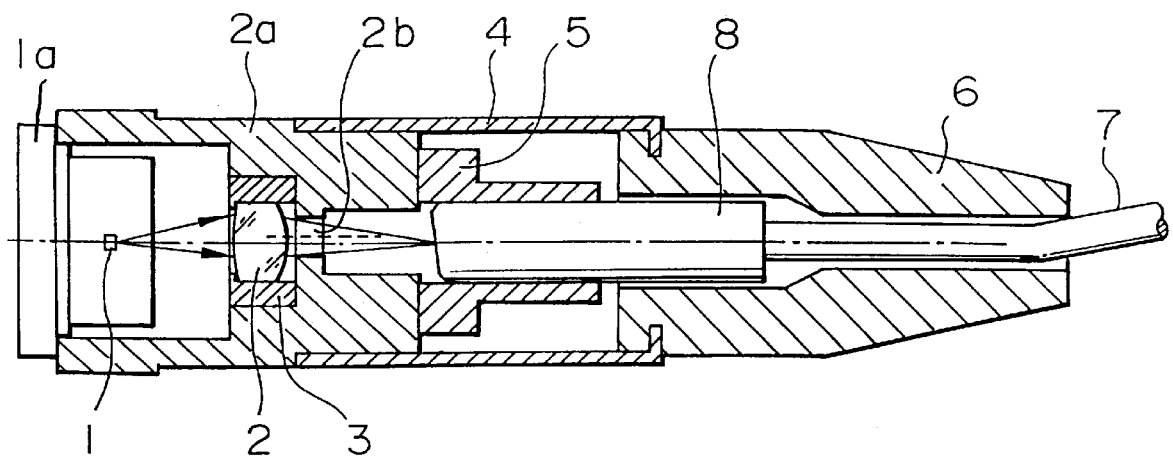
FIG. 1 is a cross-sectional view illustrating a light-emitting module according to an embodiment of the present invention.

By referring to the attached drawings, an embodiment of the present invention will be described. As shown in FIG. 1, a laser diode 1 is supported at its central position by a laser diode holder 1a, and both a lens 2 and a lens barrel 3 are supported at the central position thereof similarly by a lens holder 2a. A hood 4, a ferrule holder 5 and a rubber hood 6 are co-axially disposed with respect to the emergent side of the lens 2. The head of an optical fiber 7 is provided with a ferrule 8 which engages with the ferrule holder 5. Ends of the optical fiber 7 and the ferrule 8 are cut at an angle.

Figure 2:
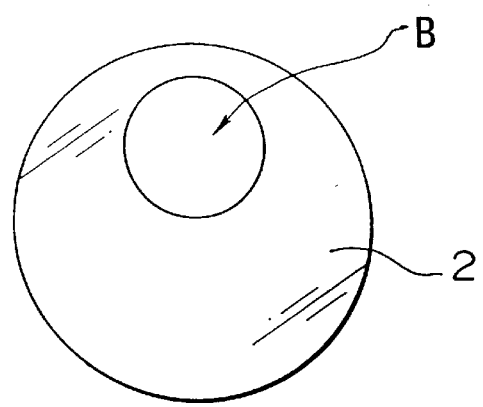
FIG. 2 is an explanatory chart illustrating an aperture on a lens shown in FIG. 1.
Figure 3:
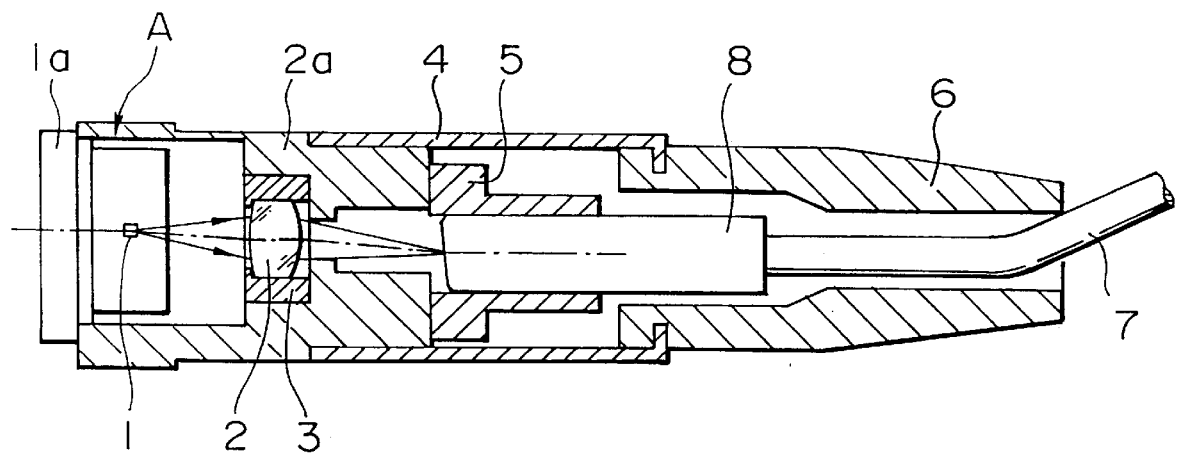
FIG. 3 is a cross-sectional view illustrating an example of a conventional light-emitting module.
Figure 4:
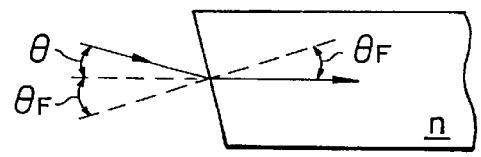
FIG. 4 is an explanatory chart illustrating the relationship between an oblique angle and an incident angle at an incident end face of an obliquely cut optical fiber.

In the conventional example (shown in FIG. 3), the laser diode 1 and the optical fiber 7 are eccentric in mutually opposite directions with respect to the optical axis of the lens 2 so as to satisfy the equation (1). Different from the conventional example, this embodiment has an arrangement in which the laser diode 1, the lens 2 and the optical fiber 7 are co-axially disposed and an opening 2b formed on the emergent side of the lens holder 2a is eccentric from the optical axis of the lens 2 so as to satisfy the equation (1). This opening 2b constitutes an aperture B on the lens 2, and as shown in FIG. 2, the aperture B on the lens 2 is eccentric so as to be positioned opposite to the vertical direction with respect to the end face of the obliquely cut optical fiber 7. Consequently, even when the laser diode 1, the lens 2 and the optical fiber 7 are co-axially disposed, light which is refracted by the end face of the core of the optical fiber 7 travels along the axial direction, thus, the outer diameter of the light-emitting module can be reduced.

Since a portion that surrounds the laser diode 1 in the lens holder 2a can be formed so as to have a uniform, large thickness, the light-emitting module is strong against vibration and shock without having an excessively large outer diameter. In addition, the ferrule holder 5 and the lens holder 2a can be co-axially disposed, therefore, the contact area of the ferrule holder 5 and the lens holder 2a can be enlarged so that the ferrule holder 5 does not butt into the hood 4, which provides stable fixation (welding) of both. Also, the ferrule 8 can be co-axially disposed with respect to the rubber hood 6, thus, the rubber hood 6 does not need to have an excessively large inner diameter so the rubber hood 6 can naturally function to prevent disconnection.

Concerning this type of light-emitting module, a pig tail type in which the optical fiber 7 is fixed as shown in FIG. 1, and a receptacle type in which the optical fiber 7 is removally fixed are known. The present invention can be applied to the latter receptacle type of light-emitting module.

What is claimed is:

1. A light-emitting module in which a laser diode, a lens, and an optical fiber having an end face cut at an angle are co-axially disposed, said lens having an aperture eccentrically disposed opposite to the vertical direction with respect to an end face of said optical fiber so that light refracted by an end face of the core of said optical fiber travels in the axial direction.

2. A light-emitting module according to claim 1, further including a lens holder for supporting said lens, wherein said aperture on said lens is eccentrically disposed by an opening formed in said lens holder.

3. The light-emitting module of claim 1 wherein the aperture is eccentrically disposed such that, at the end face of the optical fiber, an angle of incidence of the light θ as measured from the axial direction is approximately equal to $\sin^{-1}(n \sin\theta_F) - \theta_F$, where n is an index of refraction of the optical fiber and $\theta_F$ is the angle of the end face of the optical fiber.

4. A light-emitting module having an optical axis comprising:

a laser diode mounted co-axially with the optical axis;

an optical fiber including an end face cut at an angle, the optical fiber mounted co-axially with the optical axis;

a lens mounted co-axially with the optical axis and located between the laser diode and the optical fiber; and an aperture eccentrically disposed with respect to the optical axis so that light passing through the aperture is incident on the end face of the optical fiber and refracted along the optical axis.

5. The light-emitting module of claim 4 further comprising:

a lens holder securing the lens between the laser diode and the optical fiber, the lens holder including the aperture.

6. The light-emitting module of claim 4 wherein the aperture is formed from a light shielding layer disposed on the lens.

7. The light-emitting module of claim 4 wherein the aperture is eccentrically disposed such that an angle of incidence θ of the light at the end face of the optical fiber and measured with respect to the optical axis is approximately equal to $\sin^{-1}(n \sin\theta_F) - \theta_F$, where n is an index of refraction of the optical fiber and $\theta_F$ is the angle of the end face of the optical fiber.

* * * * *